(12) United States Patent
Wang et al.

(10) Patent No.: US 8,371,843 B2
(45) Date of Patent: Feb. 12, 2013

(54) PLASTIC INJECTION MOLD

(75) Inventors: Xian-yun Wang, Tu Cheng (TW); Xiao-ping Wu, Tu Cheng (TW); Shih-hsiung Ho, Tu Cheng (TW)

(73) Assignee: Cheng Uei Precision Industry Co., Ltd., Tu Cheng, Taipei (TW)

(*) Notice: Subject to any disclaimer, the term of this patent is extended or adjusted under 35 U.S.C. 154(b) by 330 days.

(21) Appl. No.: 12/913,738

(22) Filed: Oct. 27, 2010

(65) Prior Publication Data

US 2012/0107446 A1 May 3, 2012

(51) Int. Cl.
*B29C 45/44* (2006.01)

(52) U.S. Cl. .......... 425/556; 425/441; 425/DIG. 5; 425/DIG. 58

(58) Field of Classification Search .......... 425/438, 425/441, 556, DIG. 5, DIG. 58; 264/334
See application file for complete search history.

(56) References Cited

U.S. PATENT DOCUMENTS

| | | | | |
|---|---|---|---|---|
| 2,994,921 A * | 8/1961 | Hultgren | | 425/308 |
| 3,049,759 A * | 8/1962 | Eberhardt | | 425/438 |
| 3,849,053 A * | 11/1974 | Bruce et al. | | 425/438 |
| 4,515,342 A * | 5/1985 | Boskovic | | 249/122 |
| 4,765,585 A * | 8/1988 | Wieder | | 249/64 |
| 4,768,747 A * | 9/1988 | Williams et al. | | 249/63 |
| 5,378,422 A * | 1/1995 | Musiel et al. | | 264/238 |
| 5,407,344 A * | 4/1995 | Rombalski et al. | | 425/190 |
| 6,609,903 B2 * | 8/2003 | Kurimoto | | 425/556 |
| 7,175,421 B2 * | 2/2007 | Takemoto et al. | | 425/577 |
| 7,264,465 B2 * | 9/2007 | Schwaiger et al. | | 425/577 |
| 7,381,051 B2 * | 6/2008 | Wang et al. | | 425/577 |
| 8,147,238 B1 * | 4/2012 | Zou et al. | | 425/577 |
| 2004/0076703 A1 * | 4/2004 | Saulle | | 425/190 |
| 2011/0280985 A1 * | 11/2011 | Santos et al. | | 425/556 |
| 2012/0076887 A1 * | 3/2012 | Wu et al. | | 425/468 |
| 2012/0082746 A1 * | 4/2012 | Li et al. | | 425/411 |
| 2012/0082752 A1 * | 4/2012 | Li et al. | | 425/556 |
| 2012/0107446 A1 * | 5/2012 | Wang et al. | | 425/556 |
| 2012/0177774 A1 * | 7/2012 | Kaufman et al. | | 425/556 |
| 2012/0280985 A1 * | 11/2012 | Abe | | 345/419 |

FOREIGN PATENT DOCUMENTS

JP 02008012873 A * 1/2008
JP 02011020423 A * 2/2011

* cited by examiner

*Primary Examiner* — Yogendra Gupta
*Assistant Examiner* — Emmanuel S Luk
(74) *Attorney, Agent, or Firm* — Cheng-Ju Chiang

(57) ABSTRACT

Disclosed is a plastic injection mold, including a stationary mold member and a movable mold member mating with the stationary mold member. An inclined guide pillar and a stop block having a block plan are fixedly disposed on the stationary mold member. A slide having a molding portion is slidably disposed on the movable mold member. A guide pillar hole and an ejector hole are defined in the slide, and a molding cavity is defined by the molding portion with the stationary and the movable mold member. An ejection mechanism disposed on the slide includes an ejector rod and a spring. In a mold release process, a product molded with the mold is initially held by an ejector rod to prevent the product from being deformed when pulled by the slide for ensuring the quality of the molding product.

3 Claims, 4 Drawing Sheets

PLASTIC INJECTION MOLD

TECHNICAL FIELD OF THE INVENTION

The present invention relates to a mold, and especially to a plastic injection mold.

BACKGROUND OF THE INVENTION

Referring to FIG. 6, a conventional mold 20 includes a stationary mold member 21 and a movable mold member 22 mating the stationary mold member 21. An inclined guide pillar 23 is fixed on the stationary mold member 21. A slide 24 is slidably disposed on the movable mold member 22, and a guide pillar hole (not shown), which is provided for accommodating the inclined guide pillar 23 therein, is defined in the slide 24.

Referring to FIG. 7, when the mold 20 is being opened to release a molded product, the stationary mold member 21 moves jointly with the moving inclined guide pillar 23.

Due to the inclined guide pillar 23, the slide 24 is caused to slide and separates from the product, while the product is kept on the movable mold member 22.

Since the parts of the slide 24 in contact with the product are separated at the same time when the above-mentioned mold 20 is being opened to release the molded product, there is often a larger adhesive force between the product and the slide, and correspondingly, the product needs to withstand a larger pulling force caused by the slide 24, hence resulting in the product being deformed when pulled by the slide 24, thereby without achieving product requirements.

SUMMARY OF THE INVENTION

An objective of the present invention is to provide a plastic injection mold for preventing deformation occurring in a mold release process in order to overcome the drawback of the above-mentioned prior art.

To achieve the foregoing objective, according to the present invention, a plastic injection mold is provided, which comprises a stationary mold member, an inclined guide pillar, a stop block, a movable mold member, a slide, and an ejection mechanism. The inclined guide pillar is fixedly disposed on the stationary mold member; the stop block, having a block plane, is fixedly disposed on the stationary mold member. The movable mold member is mating with the stationary mold member. The slide is slidably disposed on the movable mold member, and the slide has a molding portion. A guide pillar hole, which is provided for the inclined guide pillar, and an ejector hole, which extends to an end surface of the molding portion, are defined on the slide. A molding cavity is defined by the molding portion with the stationary mold member and the movable mold member. The ejection mechanism is disposed on the slide. The ejection mechanism comprises a spring and an ejector rod slidably disposed in the ejector hole of the slide. The spring is disposed between the ejector rod and the slide to prevent the ejector rod from undesirably stretching into the molding cavity. The ejector rod is kept relatively immovable with respect to the movable mold member by the block plane in an initial stage of mold opening.

As mentioned above, according to the plastic injection mold of the present invention, a product is held by an ejector rod in a mold release process. Thus, the contact surface between the product and the slide can be reduced so that the adhesive force between the product and the slide can also be reduced. Furthermore, the separation process of the product and the slide is changed from "the process of simultaneous separation of all parts" to "the process of starting from the middle gradually separating from small to big", thereby preventing the product from being deformed when pulled by the slide for ensuring the quality of the molding product.

DETAILED DESCRIPTION OF THE PREFERRED EMBODIMENT

Reference will now be made in detail to a preferred embodiment of the present invention, examples of which are illustrated in the accompanying drawings.

Figure 1:
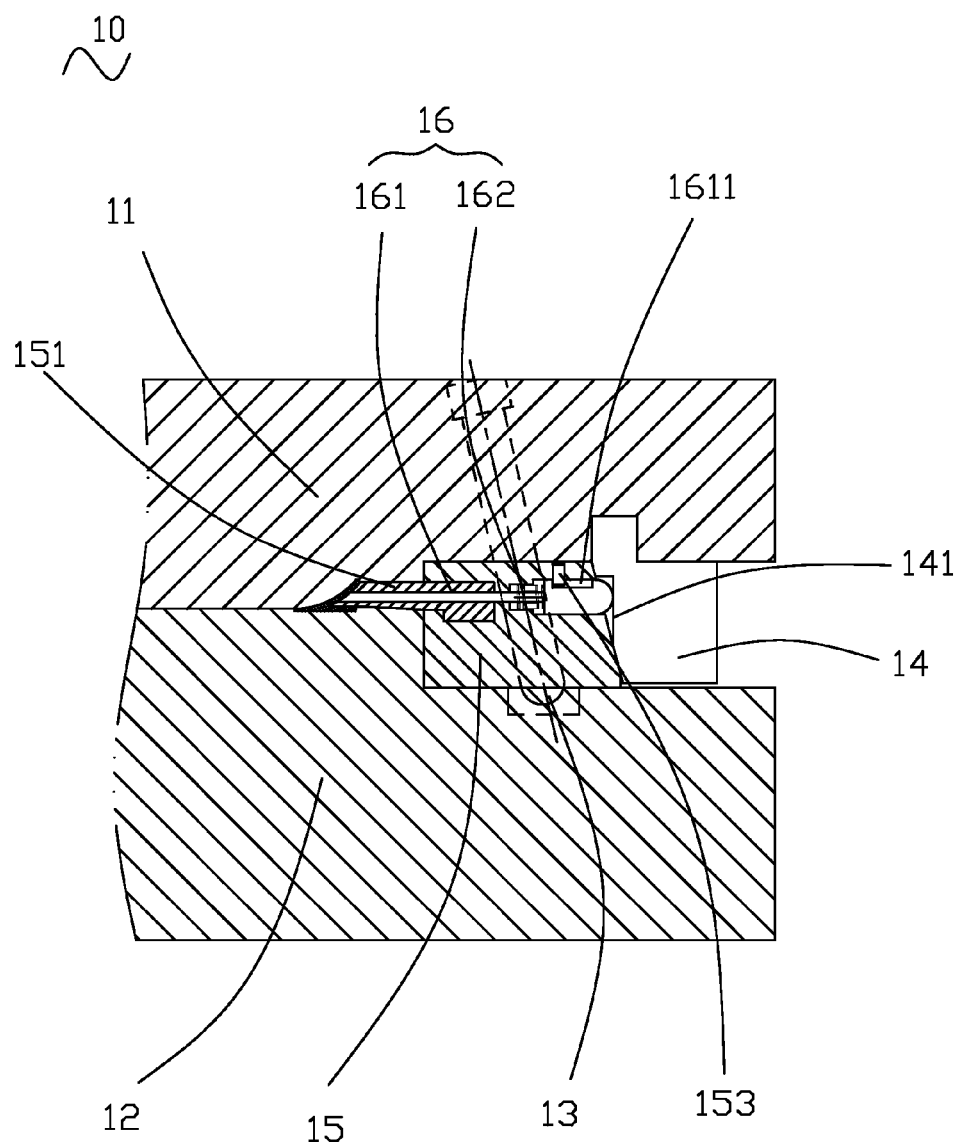
FIG. 1 is a cross-sectional view illustrating a plastic injection mold according to the present invention.
Figure 2:
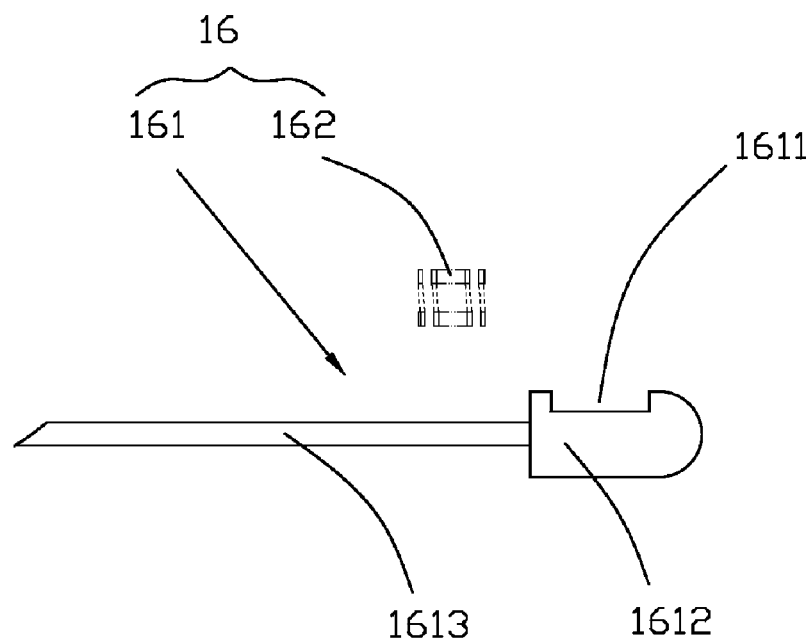
FIG. 2 is a cross-sectional view illustrating an ejection mechanism of the plastic injection mold according to the present invention.
Figure 3:
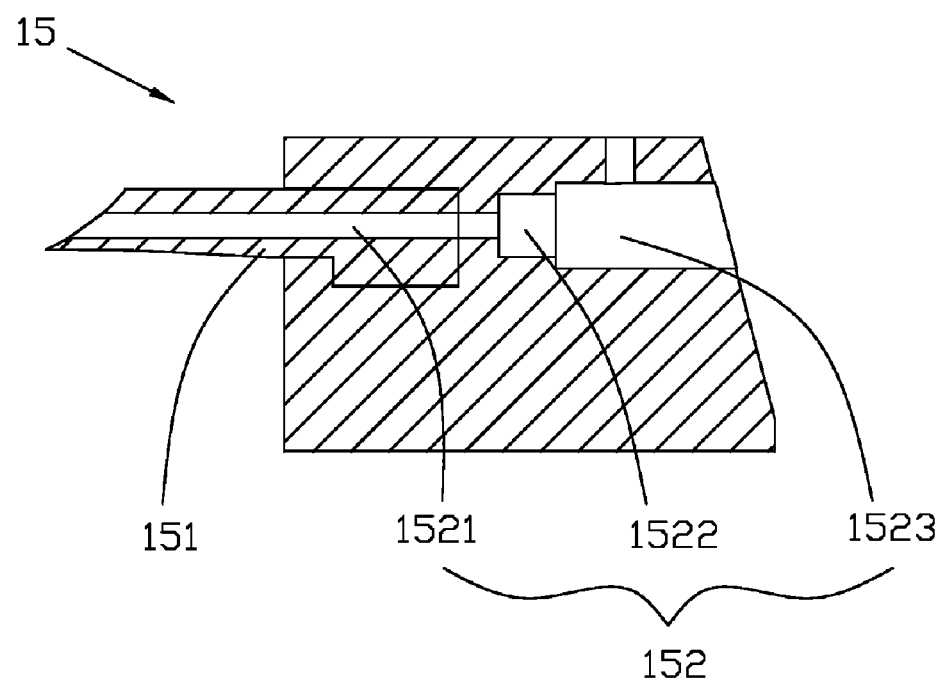
FIG. 3 is a cross-sectional view illustrating a slide of the plastic injection mold according to the present invention.

Referring to FIGS. 1, 2 and 3, a plastic injection mold 10 according to the present invention comprises a stationary mold member 11, an inclined guide pillar 13, a stop block 14, a movable mold member 12, a slide 15, and an ejection mechanism 16. The stationary mold member 11 is mating with and opposes the movable mold member 12.

The inclined guide pillar 13 and the stop block 14 are fixedly disposed on the stationary mold member 11, and the stop block 14 comprises a block plane 141.

The slide 15 is slidably disposed on the movable mold member 12, and the slide 15 comprises a molding portion 151. A guide pillar hole (not shown), which is provided for the inclined guide pillar 13, and an ejector hole 152, which extends to an end surface of the molding portion 151, are defined in the slide 15. A molding cavity is defined by the molding portion 151 with the stationary mold member 11 and the movable mold member 12.

The ejection mechanism 16 is disposed on the slide 15. The ejection mechanism 16 comprises a spring 162 and an ejector rod 161, which are slidably disposed in the ejector hole 152 of the slide 15. The spring 162 is arranged between the ejector rod 161 and the slide 15 to prevent the ejector rod 161 from undesirably stretching into the molding cavity. The ejector rod 161 is kept immovable with respect to the movable mold member 12 as being held by the block plane 141 in an initial stage of a mold opening operation.

A restrict slot 1611 is defined in the ejector rod 161, and a stop pin 153 is fixed on the slide 15. The stopper pin 153 extends into the restrict slot 1611 to prevent the ejector rod 161 from sliding out or falling off.

The ejector rod 161 comprises an ejector head 1612 and an ejector tail 1613, and the ejector head has a cross-sectional size greater than the ejector tail.

The ejector hole 152 comprises a rod tail cavity 1521 extending to the end surface of the molding portion 151 and size matching the ejector tail 1613, a spring cavity 1522 communicating the rod tail cavity 1521 and size matching the spring 162, and a rod head cavity 1523 communicating the spring cavity 1522 and the outside environment and size matching the ejector head 1612. The ejector tail 1613 is received in the rod tail cavity 1521; the spring 162 is arranged in the spring cavity 1522; and the ejector head 1612 is received in the rod head cavity 1523.

In mold closing, all the parts of the plastic injection mold 10 mate each other so that a distal end of the ejector rod 161 contacts with the block plane 141, and a proximal end thereof is set flush with the end surface of the molding portion 151. The spring 162 is slightly compressed to prevent the ejector rod 161 from sliding into the molding cavity.

In mold opening, the stationary mold member 11 in association with the inclined guide pillar 13 and the stop block 14 is moved upward, and the slide 15 is sliding rightward by the inclined guide pillar 13.

Figure 4:
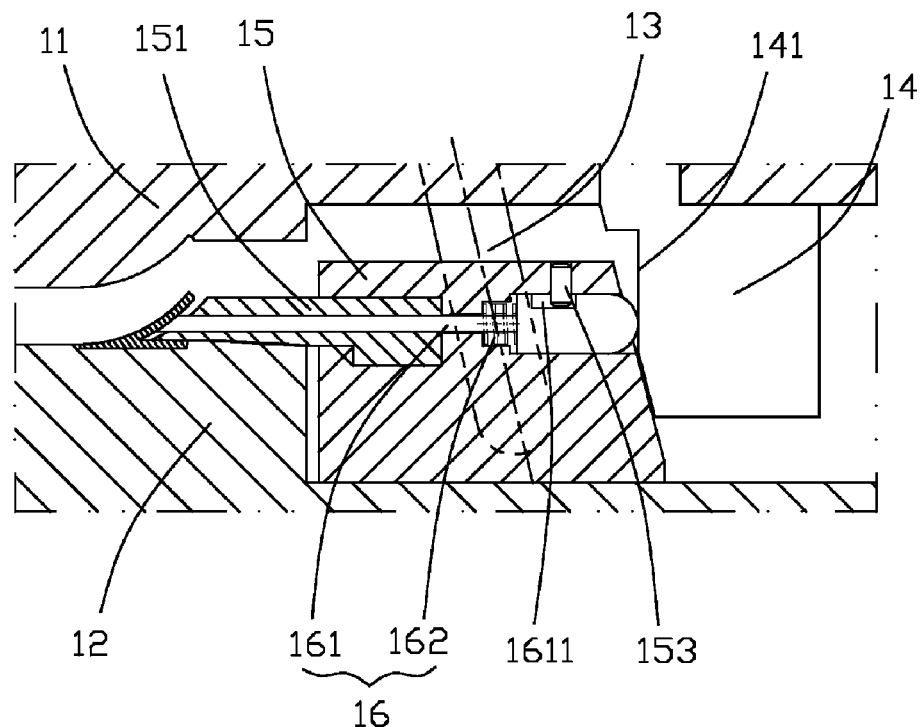
FIG. 4 is a cross-sectional view illustrating the plastic injection mold in the first half mold-opening process according to the present invention.

Referring to FIG. 4, in the first half mold-opening process, the distal end of the ejector rod 161 is pushing against the block plane 141 of the stop block 14, and the proximal end thereof is sticking out the end surface of the molding portion 151 so as to push against the molded product. The slide 15 is sliding rightward and separating from the product slowly and the spring 162 is gradually compressed.

Figure 5:
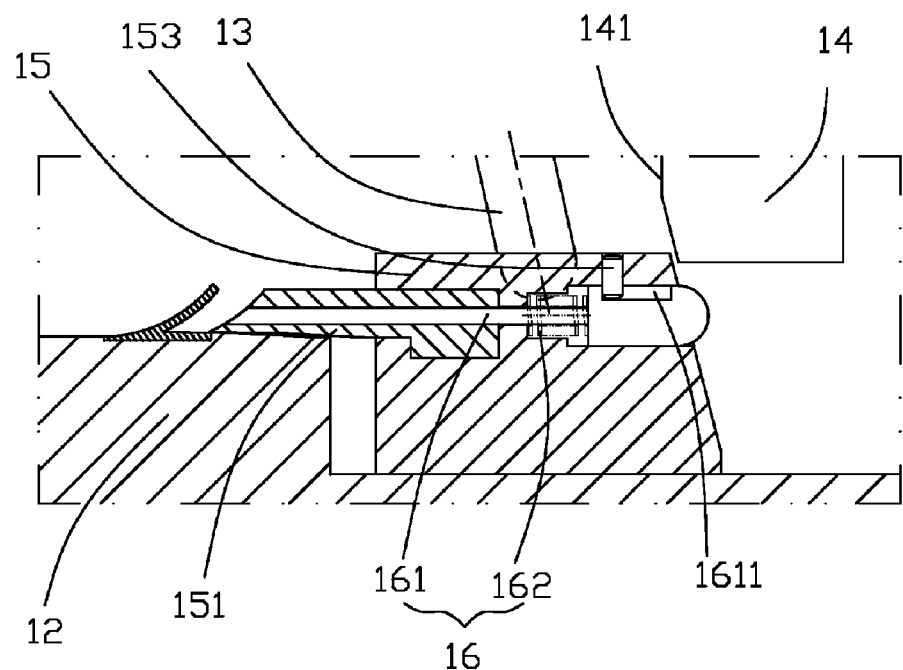
FIG. 5 is a cross-sectional view illustrating the plastic injection mold in the second half mold-opening process according to the present invention.
Figure 6:
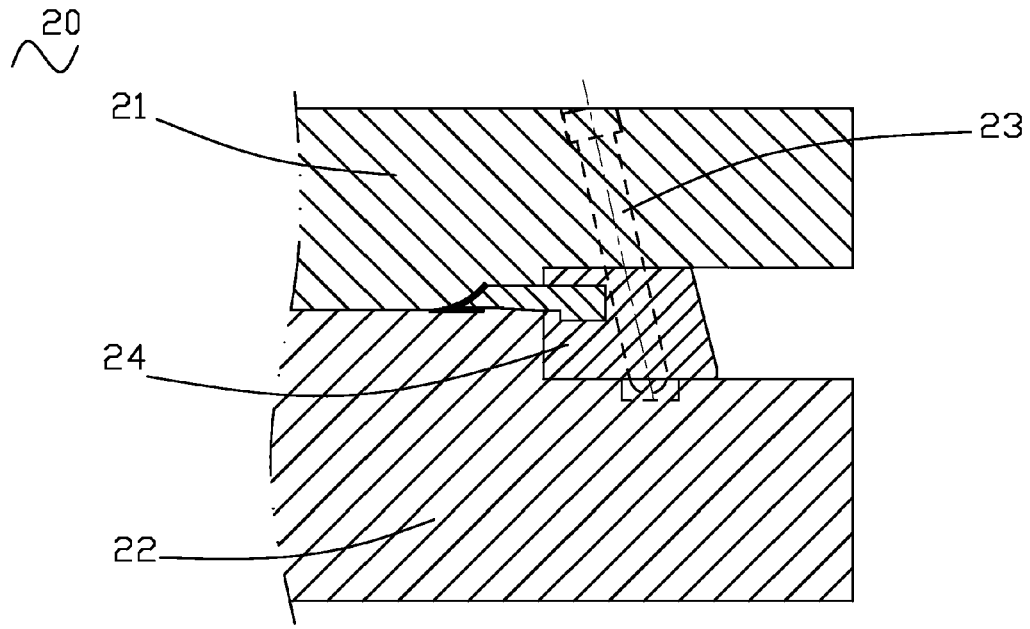
FIG. 6 is a cross-sectional view illustrating a conventional mold.
Figure 7:
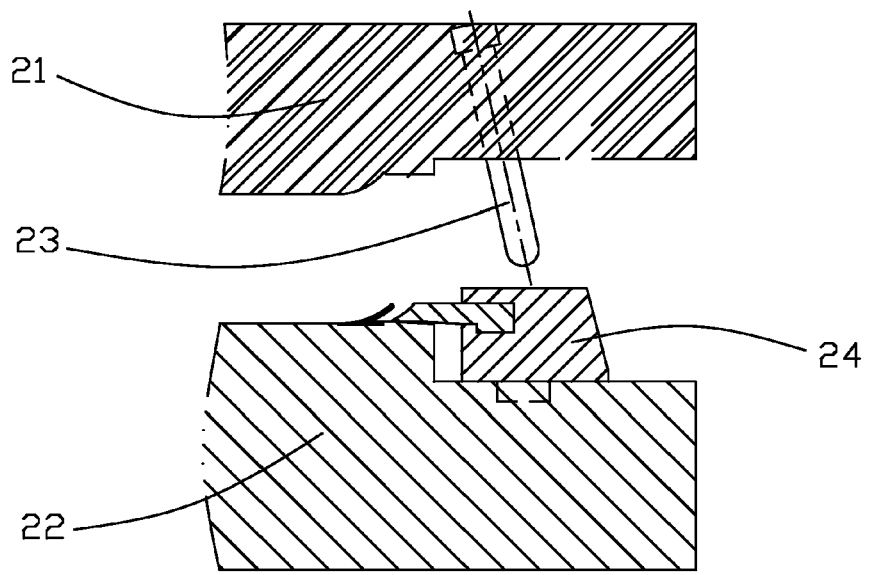
FIG. 7 is a cross-sectional view illustrating a conventional mold in mold opening.

Referring to FIG. 5, in the second half mold-opening process, the stop block 14 is continued to move up, and the slide 15 is continued to slide rightward. The ejector rod 161 is detached from the block plane 141 of the stop block 14 and is bounced off slowly by the spring 162. Finally, the stop pin 153 restrains an ejection distance of the ejector rod 161, and the spring 162 returns to the initial state; consequently, the mold release of the product is completed.

As mentioned above, according to the plastic injection mold 10 of the present invention, the product is held by an ejector rod 161 in the mold release process. Thus, the contact surface between the product and the slide 15 can be reduced so that the adhesive force between the product and the slide 15 can also be reduced. Furthermore, the separation process of the product and the slide 15 was from "the process of simultaneous separation of all parts" to "the process of starting from the middle gradually separating from small to big", thereby preventing the product from being deformed when pulled by the slide 15 for ensuring the quality of the molding product.

What is claimed is:

1. An injection mold, comprising:
    a stationary mold member;
    an inclined guide pillar fixedly disposed on the stationary mold member;
    a stop block having a block plane, being fixedly disposed on stationary mold member;
    a movable mold member being mating with the stationary mold member;
    a slide having a molding portion, slidably disposed on the movable mold member, a guide pillar hole for the inclined guide pillar and an ejector hole extending to an end surface of the molding portion being defined in the slide, a molding cavity being defined by the molding portion with the stationary mold member and the movable mold member; and
    an ejection mechanism, disposed on the slide, the ejection mechanism comprising a spring and an ejector rod being slidably disposed in the ejector hole of the slide, the spring being disposed between the ejector rod and the slide for preventing the ejector rod from undesirably stretching into the molding cavity;
    wherein the ejector rod is kept relatively immovable with respect to the movable mold member by the block plane pushing in an initial stage of mold opening.

2. The injection mold of claim 1, wherein a restrict slot is defined in the ejector rod and a stop pin fixed on the slide and extending into the restrict slot.

3. The injection mold of claim 1, wherein the ejector rod comprises an ejector head and an ejector tail, the ejector head being bigger than the ejector tail, the ejector hole comprising a rod tail cavity extending to the end surface of the molding portion and size matching the ejector tail, a spring cavity communicating the rod tail cavity and size matching the spring, and a rod head cavity communicating the spring cavity and outside environment and size matching the ejector head, the ejector tail being received in the rod tail cavity, the spring being fitted over a junction of the ejector tail and the ejector head and located in the spring cavity, the ejector head being received in the rod head cavity.

* * * * *